United States Patent

[11] 3,559,926

| [72] | Inventors | Werner Frehauf<br>Ailingen;<br>Heinz Genter, Friedrichshafen, Germany |
|---|---|---|
| [21] | Appl. No. | 823,269 |
| [22] | Filed | May 9, 1969 |
| [45] | Patented | Feb. 2, 1971 |
| [73] | Assignee | Dornier G.m.b.H.<br>Friedrichshafen, Badensee, Germany<br>a corporation of Germany |
| [32] | Priority | June 1, 1968 |
| [33] |  | Germany |
| [31] |  | P 17 56 532.1 |

[54] VTOL AIRCRAFT
23 Claims, 5 Drawing Figs.

| [52] | U.S. Cl. | 244/56 |
|---|---|---|
| [51] | Int. Cl. | B64d 29/00 |
| [50] | Field of Search | 244/52, 53, 54, 55, 56, 12, 23 |

[56] References Cited
UNITED STATES PATENTS

| 2,971,725 | 2/1961 | Jakimiuk | 244/56(X) |
| 3,089,666 | 5/1963 | Quenzler | 244/7 |
| 3,167,273 | 1/1965 | Alvarez-Calderon | 244/52(X) |
| 3,260,049 | 7/1966 | Johnson | 244/52(X) |

*Primary Examiner*—Milton Buchler
*Assistant Examiner*—James E. Pittenger
*Attorney*—James E. Bryan ABSTRACT: A VTOL aircraft has at least one engine supported on each side of the longitudinal central axis of the aircraft, each of these engines being supported for pivotal movement about an axis extending obliquely downwardly and away from the fuselage so that the engine means pivots from a normal- operating position to a takeoff and landing position wherein the air intake of the engine means is disposed a greater distance from the longitudinal central plane of the aircraft and at a greater vertical elevation. Jet discharge means on each of the engine means includes movable parts which move so that in the takeoff and landing position of the engines the jet discharge is directed downwardly in a substantially vertical direction.

INVENTORS
WERNER FRÜHAUF &
HEINZ GÜNTER

VTOL AIRCRAFT

BACKGROUND OF THE INVENTION

The present invention relates to vertical takeoff and landing aircraft hereinafter referred to as VTOL aircraft which are adapted to rise and descend substantially vertically when taking off and landing.

The invention relates particularly to VTOL aircraft having jet engines. In this type of aircraft, the gas jets from the engines are directed vertically downwardly by moving the jet engines from their normal position so that the vertically directed jets enable substantially vertical movement of the aircraft.

When such an aircraft is on the ground or near the ground, the hot discharge gases of the engines strike the ground and spread out in all directions. A portion of the hot engine gases converge beneath the fuselage of the aircraft along the longitudinal central plane of the aircraft and produce an upwardly directed flow of hot gas.

As the hot gas streams upwardly on both sides of the fuselage of the aircraft, the hot gas passes over the air intake means of the jet engines. This hot gas is sucked into the engines and produces intense heating within the engine which may lead to considerable damage.

This problem has been recognized for some time in the art, and many measures have been proposed to avoid these undesirable results. Platforms are sometimes placed on the ground in the path of the gas discharged from the engines, these platforms including deflecting channels for leading off the hot discharge gases into an area so that the gases will not rise in the vicinity of the air intakes of the engines. Such platforms are, however, undesirable since they are quite expensive and severely limit the operational flexibility of the aircraft.

SUMMARY OF THE INVENTION

The present invention includes at least one jet engine on each side of the longitudinal central plane of the aircraft and each being mounted for pivotal movement about a pivot axis extending obliquely downwardly and away from the fuselage so that the engines each pivot from a normal operating position to a takeoff and landing position wherein the air intakes of the jet engines are disposed a greater distance from the longitudinal central plane of the aircraft and at a greater vertical elevation than in the normal position thereof.

In addition, the jet discharge means of each of the engines includes relatively movable portions which are adapted to be moved during pivotal movement of the engines so that when the engines are in the takeoff and landing position, the outlets of the jet discharge means are directed substantially in a downward vertical direction to enable the aircraft to move vertically during takeoff and landing procedures.

The arrangement of the present invention substantially reduces the danger of hot propellant gases being sucked into the air intakes of the jet engines in the takeoff and landing position. This is accomplished by pivoting each of the jet engines into such a position that the air intakes thereof are disposed a greater distance from the central plane of the aircraft and at a higher vertical elevation in the takeoff and landing position than in the normal position thereof, In addition, the outlets of the jet discharge means discharge the hot gases substantially vertically downwardly so as to provide the desired vertical thrust.

With the construction of the present invention, the temperature in the jet engines is maintained within allowable limits. The air intakes of the jet engines are pivoted into an area where the ambient air is of lower temperature than the temperatures of the hot discharge gases which are normally recirculated about the fuselage of the aircraft.

The movement of the discharge means and the movement of the jet engines are correlated with one another so as to provide the desired operative position of the jet discharge means in both the normal operating position and the takeoff and landing position of the associated engines.

Even though the jet engines are pivoted from the normal horizontal position thereof into an obliquely outwardly directed position, the thrust of the discharge gases is still directed vertically against the adjacent ground surface thereby preventing any thrust losses. A further advantageous feature of the present invention is the fact that the axis of the outlet of each of the jet discharge means is disposed at an angle of greater than 90° with respect to the longitudinal axis of the associated engine whereby the deflecting losses are minimized.

The jet discharge means provides a further advantageous effect in that the axes of the outlets of the discharge means are parallel with one another and to the longitudinal central plane of the aircraft.

During the pivoting movement of the engines, no lateral deflection of the jet vectors occurs and the effective thrust is not reduced. Furthermore, as the engines are pivoted into the takeoff and landing position, the lever arms between the jet vectors and the longitudinal central plane of the aircraft is shortened so that in case of engine malfunction, rolling moments produced thereby are reduced.

The jet engines of the present invention are pivoted about axes disposed as far rearwardly in the direction of the longitudinal axis of the jets as possible so as to be near the pitch axis of the aircraft whereby only small lever arm changes with respect to the pitch axis occur during pivoting movement of the engines. In the takeoff and landing positions of the engines, the jet discharge means is advantageously located so that the axes of the outlets thereof are disposed in a common plane which includes the center of gravity of the aircraft.

DESCRIPTION OF THE PREFERRED EMBODIMENT SINGULAR

Figure 1:
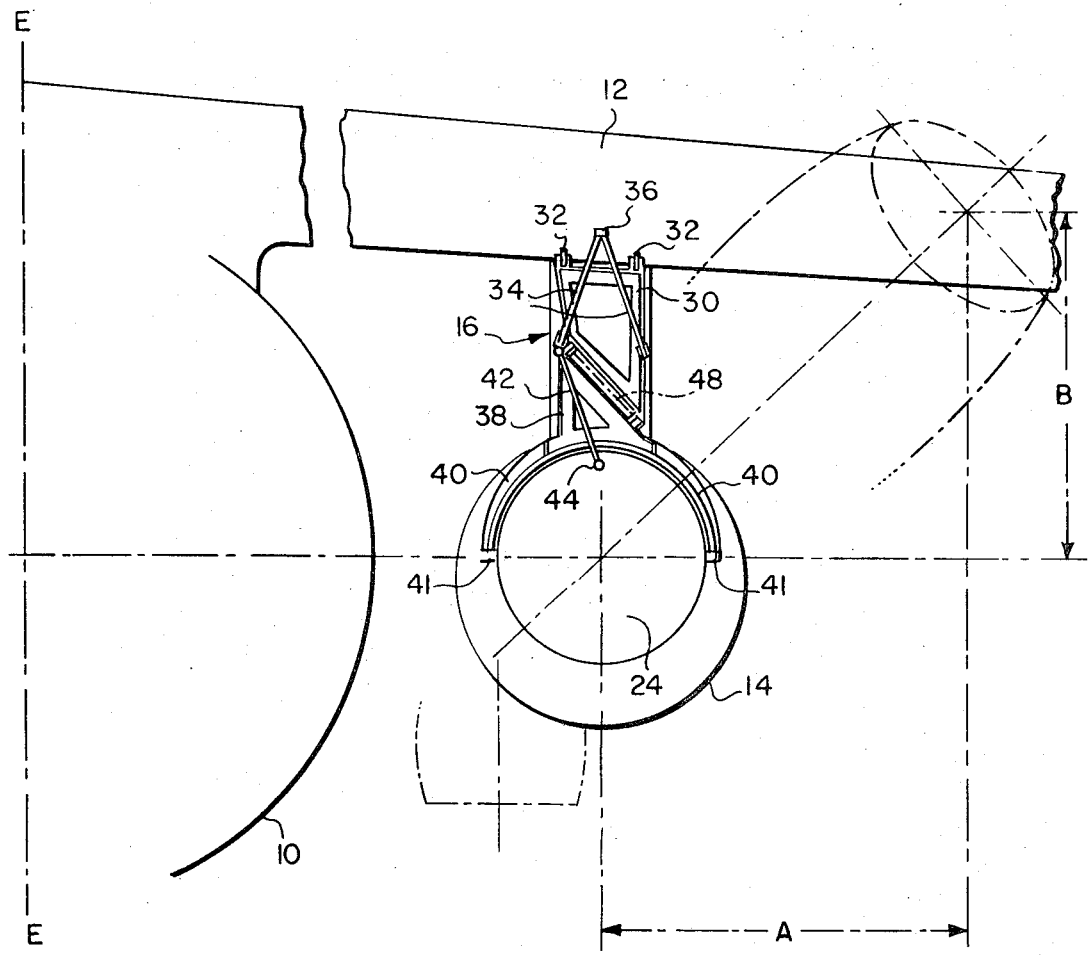
FIG. 1 is a front view of a portion of an aircraft according to the present invention illustrating one jet engine supported from the wing thereof with certain parts removed for the sake of clarity.

Referring to the drawings wherein like reference characters designate corresponding parts are at the several views, the VTOL aircraft of the present invention includes a fuselage 10 and a wing 12 which is interconnected with the fuselage to provide a high-wing monoplane construction. A conventional jet engine 14 is supported from the wing by support means indicated generally be reference numeral 16. A plurality of jet engines are provided, at least one jet engine being disposed on each side of the longitudinal central plane of the aircraft as indicated by reference characters E-E. The arrangement of the jet engines and the support means therefore is symmetrical with respect to said longitudinal central plane and are a mirror image of one another.

The jet engines of the present invention are adapted to provide both the forward thrust and the vertical thrust required during takeoff and landing. Each engine includes jet discharge means 20 at the rear of the engine including an outlet at 22 for the hot discharge gases from the engine. This jet discharge means is adapted to be moved during operation so as to deflect the discharge gases as hereinafter explained. Conventional air intake means 24 is provided at the forward end of each jet engine.

The support means for each jet engine includes a support framework 30 which is rigidly connected to the wing by fastening means 32. Reinforcement struts 34 have the rear ends thereof connected with frame 30, the forward ends of struts 34 being rigidly connected to the wing by connecting means 36.

A second support frame 38 is rigidly interconnected with jet engine 14 by means of a saddle bracket 40 extending on both sides of the jet engine and connected therewith by fastening means 41. Reinforcing strut 42 has the rear end thereof interconnected with frame 38, the forward end of this strut being connected to the jet engine by fastening means 44.

Figure 2:
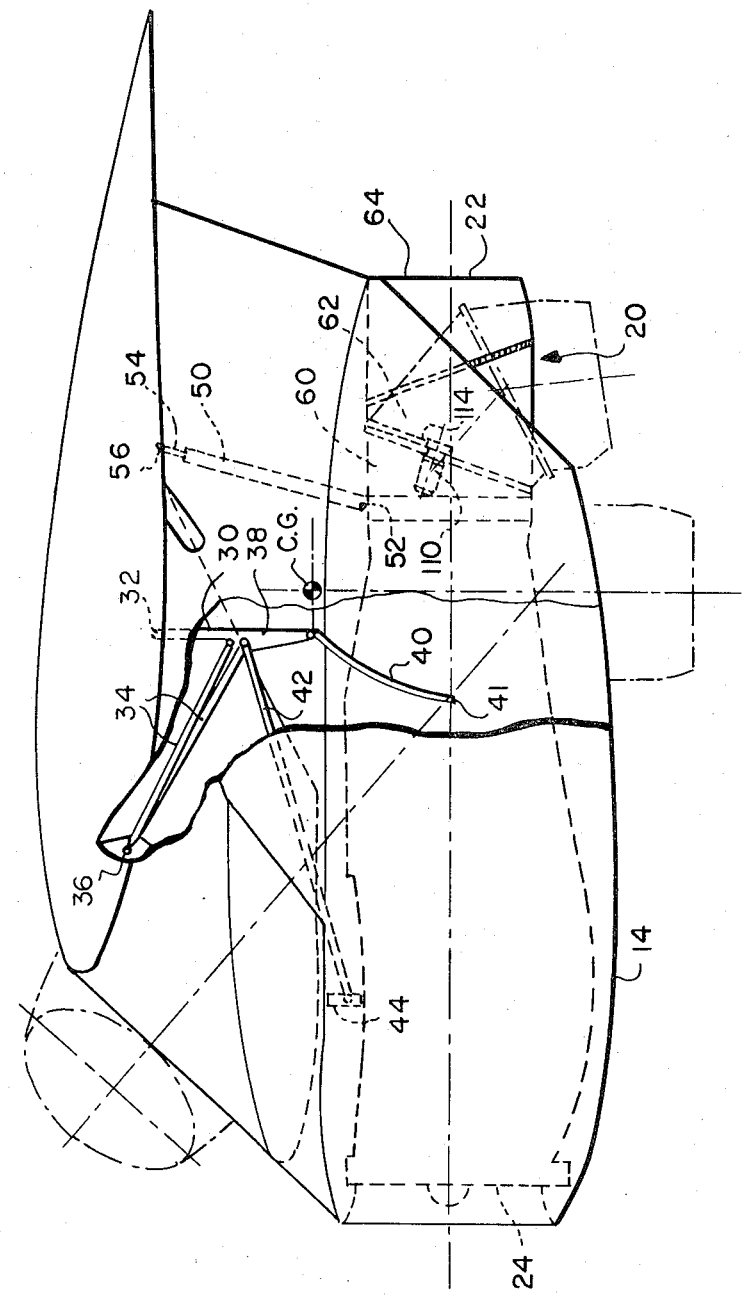
FIG. 2 is a side view, partially broken away, of the structure shown in FIG. 1.

As seen especially in FIG. 1, support frame 38 is pivotally interconnected with support frame 30 for pivotal movement about a pivot axis 48 which extends obliquely downwardly and away from the aircraft. The pivot axes of all of the engine of the aircraft lie in common plane extending substantially perpendicular to the longitudinal central plane E–E of the aircraft. The pivot axis 48 of each of the engines is positioned as far rearwardly with respect to the longitudinal axis of the associated engine as possible in view of safety requirements so that this pivot axis will be disposed adjacent to the pitch axis of the aircraft which as seen in FIG. 2 extends normally to the plane of the paper through the center of gravity of the aircraft indicated by reference character c. g. This insures that as the engine pivots from its normal operating position as shown in full lines in the drawings to its takeoff and landing position as shown in phantom o lines, only small lever arm changes will occur.

Power operated means is provided for pivoting the engine means and comprises a hydraulic ram means including a cylinder 50 pivotally interconnected at 52 to the engine, the piston rod 54 of the hydraulic ram means being pivotally interconnected at 56 to the wing of the aircraft. Suitable conventional hydraulic control means is provided in the aircraft for remotely controlling the operation of the hydraulic ram means.

Figure 3:
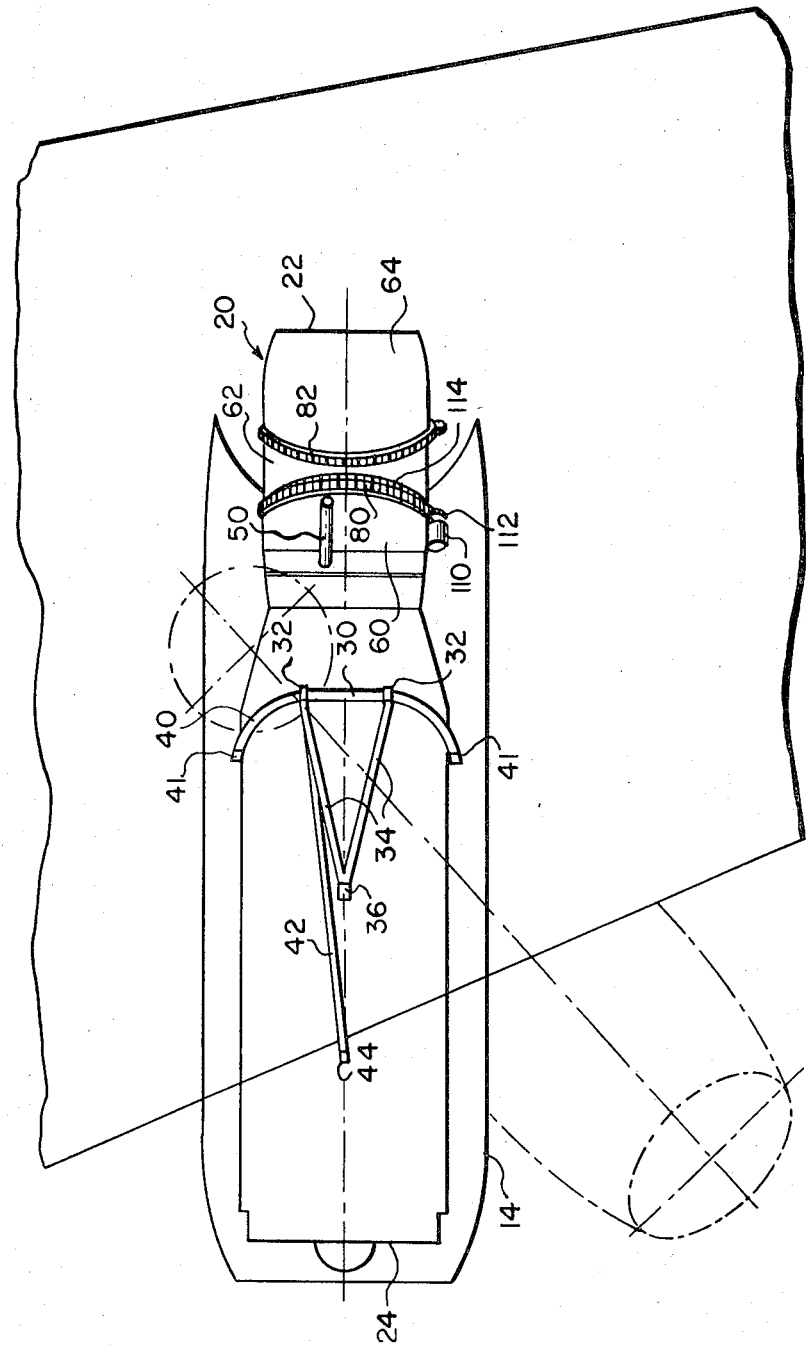
FIG. 3 is a top view of the structures shown in FIGS. 1 and 2.
Figure 4:
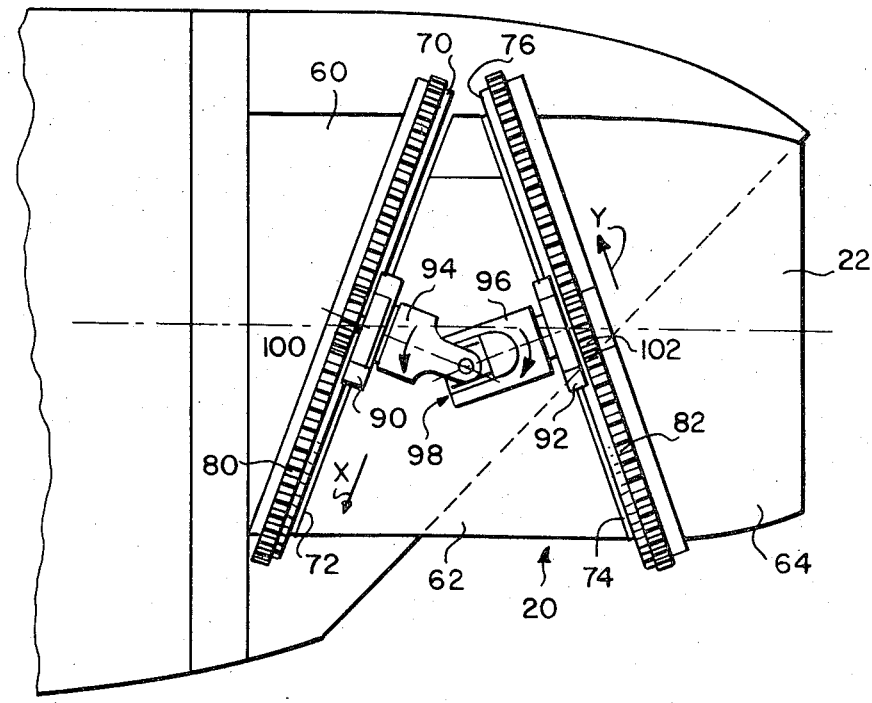
FIG. 4 is an enlarged side view of the jet discharge means of an engine with certain parts removed for the sake of illustration.

As seen most clearly in FIGS. 3 and 4, jet discharge means 20 includes a plurality of tubular portions 60, 62, and 64, which are relatively movable with respect to one another. It will be noted that each of these jet discharge portions are of tapered configuration and include beveled cooperating end surfaces for a purpose hereinafter described.

Portion 60 is fixedly connected with respect to the jet engine and supported thereby, this portion having a beveled end surface 70. The intermediate portion 62 has a first beveled end surface 72 complementary to beveled end surface 70 of portion 60, and a second beveled end surface 74 of intermediate portion is complementary a beveled end surface 76 of the rearmost portion 64.

A rack 80 is supported at the rear part of portion 60 and extends therearound. A similar rack 82 is supported at the forward part of portion 64 and extends therearound.

The intermediate portion 62 of the jet discharge means carries a pair of bearing support means 90 and 92 which rotatably support shafts 94 and 96. These shafts are interconnected by a conventional universal joint 98. Pinions 100 and 102 are fixed to the outer ends of shafts 94 and 96 respectively and are in constant meshing engagement with the racks 80 and 82 respectively.

It is apparent the pinions 100, 102 and the associated shafts 94 and 96 provide a universal driving connection between racks 80 and 82 interconnected with portions 60 and 64 respectively.

As seen most clearly in FIGS. 2 and 3, a drive means 110 in the form of a hydraulic motor is supported on portion 60 and is drivingly connected with a pinion 112 in continuous meshing engagement with a rack 114 secured to intermediate portion 62 of the jet discharge means and extending therearound. Motor 110 is also operated by the aforementioned conventional hydraulic control means which is operatively connected with the hydraulic ram means for pivoting the jet engine. The movement of such hydraulic ram means and the hydraulic motor are suitably correlated with one another so as to provide the desired degree of movement of the portions of the jet discharge means in timed relationship to the pivoting movement of the associated engine means.

Figure 5:
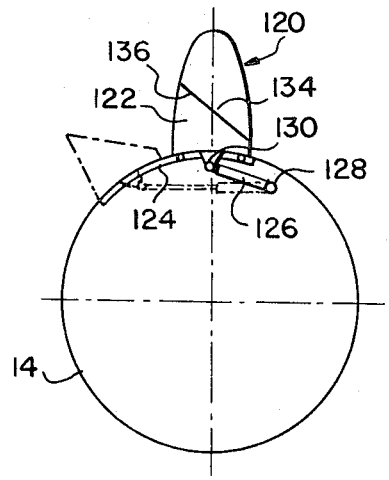
FIG. 5 is a front view of the jet engine shown in FIG. 1 and illustrating the manner in which a portion of the fairing thereof is movable.

Referring now to FIG. 5, fairing 120 is providing about the engine support means in the conventional manner to reduce aerodynamic drag. This fairing means includes a movable portion 122 which moves along a guide means 124 in the form of a guide track supported by the engine means. Power operated means 126 is provided for moving the movable portion of the fairing means, this power operated means being in the form of a hydraulic ram means the cylinder of which is pivotally connected at 128 to a portion of the engine means. The piston rod of this hydraulic ram means is pivotally connected at 130 to the movable portion of the fairing.

The fixed and movable portions of the fairing have inclined abutting surfaces 134 and 136 as seen in full lines in FIG. 5, these surfaces being inclined in a manner similar to the adjacent pivot axis of the engine.

OPERATION

When it is desired to move the engines of the aircraft from the normal operating position to the takeoff and landing position the hydraulic ram means connected with a movable portion of the fairing is actuated to move the fairing to the phantom line position shown in FIG. 5 so as to permit free pivotal movement of the associated engine means.

The power operated ram means connected between the wing of the aircraft and the engine means is then operated to pivot the engine means from the normal operating position shown in solid lines in the drawings to the takeoff and landing position illustrated in phantom lines.

As seen in FIG. 1, it will be noted that when the engine is pivoted into the takeoff and landing position, the air intake of the engine is spaced from the longitudinal central plane of the aircraft a distance which is greater by the dimension A than such spacing when the engine is in its normal operating position. Also, the air intake of the engine is disposed at a vertical elevation which exceeds by the dimension B the elevation of the air intake of the engine in its normal position.

As the jet engine swings about its pivot axis under the influence of the hydraulic ram means operatively associated therewith, hydraulic motor 110 is also operated in a predetermined relationship with respect to movement of the jet engine.

Upon operation of hydraulic motor 110 pinion 112 is rotated and through the driving interengagement thereof with rack 114 causes portion 62 of the jet discharge means to be rotated in one direction which is assumed to be in the direction as indicated by arrow X in FIG. 4. The intermediate portion 62 is thereby rotated with respect to intermediate portion 60 to move it from the solid line position as shown in FIGS. 2 and 4 to the phantom line position as seen in FIG. 2.

As intermediate portion 62 rotates, pinion 100 carried thereby will be caused to rotate due to its interengagement with fixed rack 80. Accordingly, shaft 94 will be driven in the direction of the arrow as shown in FIG. 4 which will cause rotation of shaft 96 and the associated pinion 102 in the direction indicated by the arrow. This rotation of pinion 102 will cause portion 64 to be rotated in the direction indicated by arrow Y whereby portion 64 is rotated oppositely to portion 62.

Due to the tapered configuration of the portions of the jet discharge means and drive ratio of 1:1 through the universal drive connection, the portions 62 and 64 are rotated to the same extent in opposite directions whereby the direction of the jet discharge is altered from horizontal to vertical or viceversa without the formation of any lateral thrust components.

In addition, the jet discharge from the various engines will remain at all times parallel with one another and to the longitudinal central plane of the aircraft as the engines pivot between the two operative positions thereof.

The correlation of the movement of the hydraulic ram means which pivots the engine means and the drive motor for the jet discharge means is such that when the engines reach the pivoted takeoff and land landing position, the outlets of the jet discharge means are directed substantially vertically and the axes thereof are parallel and lie in a common plane which includes the center of gravity of the aircraft. Additionally, when the engines are in the takeoff and landing positions, the axes of the outlets of the jet discharge means define an angle of greater than 90° with respect to the longitudinal axis of the associated engine to minimize deflection losses.

As each engine swings about its pivot axis, only relatively small changes of the length of the lever arms with respect to the pitch axis occur.

It will be obvious to those skilled in the art that many modifications may be made within the scope of the present invention without departing from the spirit thereof, and the invention includes all such modifications.

We claim:

1. A VTOL aircraft including a plurality of engine means, at least one of said engine means being mounted on each side of the longitudinal central plane of the aircraft, each of said engine means including air intake means and jet discharge means having a jet outlet, each of said engine means being movably mounted on a pivot structure whose axis extends downwardly and outwardly from the aircraft and means for moving each of said engine means from a normal operating position to a takeoff and landing position wherein said air intake means is mounted a greater distance from said plane than in the normal operating position and further wherein said outlet is directed in a substantially vertical direction.

2. Apparatus as defined in claim 1 wherein said air intake means in the takeoff and landing position of the engine means is also mounted at a greater vertical elevation than in the normal operating position thereof.

3. Apparatus as defined in claim 1 wherein each of said engine means is mounted for pivotal movement about a pivot axis, the pivot axis, the pivot axes of said engine means lying in a common plane.

4. Apparatus as defined in claim 3 wherein said common plane extends at substantially right angle to said longitudinal central plane.

5. Apparatus as defined in claim 3 wherein each of said pivot axes extends obliquely downwardly and outwardly of the aircraft.

6. Apparatus as defined in claim 3 wherein each of said pivot axes is positioned adjacent to the pitch axis of the aircraft.

7. Apparatus as defined in claim 1 wherein the outlet of said discharge means in the takeoff and landing position of the engines are directed in directions substantially parallel to one another and parallel with said longitudinal central plane.

8. Apparatus as defined in claim 7 wherein the outlets in said takeoff and landing position have the axes thereof positioned in a common plane.

9. Apparatus as defined in claim 8 wherein the center of gravity of the aircraft lies substantially in said common plane.

10. Apparatus as defined in claim 1 wherein the axis of the outlet of each of said discharge means in the takeoff and landing position defines an angle of greater than 90° with respect to the longitudinal axis of the associated engine means.

11. Apparatus as defined in claim 1 wherein said jet discharge means includes a plurality of portions, some of said portions being relatively movable with respect to one another, and means to cause relative movement of said portions with respect to one another.

12. Apparatus as defined in claim 11 wherein the operation of the means to cause relative movement of the portions of the jet discharge means is correlated to the operation of the means for moving said engine means.

13. Apparatus as defined in claim 11 wherein said movable portions of the jet discharge means are mounted for rotation with respect to one another.

14. Apparatus as defined in claim 13 wherein said movable portions are of tapered configuration.

15. Apparatus as defined in claim 14 wherein said movable portions have complementary adjacent beveled surfaces.

16. Apparatus as defined in claim 11 wherein said means for causing relative movement of the movable portions of the jet discharge means includes rack means on said movable portions.

17. Apparatus as defined in claim 16 including drive means drivingly interconnected with one of the said racks or driving one of said movable portions.

18. Apparatus as defined in claim 16 including a driving connection between the racks of different ones of said movable portions.

19. Apparatus as defined in claim 18 wherein said driving connection is a universal driving connection.

20. Apparatus as defined in claim 1 including support means for supporting each of said engine means, fairing means adjacent said support means, said fairing means including a movable portion.

21. Apparatus as defined in claim 20 including power operated means for moving said movable portion.

22. Apparatus as defined in claim 20 including guide means extending circumferentially about the associated engine for guiding movement of said movable portion of the fairing means.

23. Apparatus as defined in claim 20 wherein each of said engine means is mounted for pivotal movement about an inclined axis, said movable portion of the fairing means and an adjacent part of the fairing means having inclined abutting surfaces corresponding to the adjacent inclined pivot axis.